US007866294B2

(12) United States Patent
Lykowski et al.

(10) Patent No.: US 7,866,294 B2
(45) Date of Patent: *Jan. 11, 2011

(54) ELECTRODE FOR AN IGNITION DEVICE

(75) Inventors: James D. Lykowski, Temperance, MI (US); Iryna Levina, Minneapolis, MN (US)

(73) Assignee: Federal-Mogul Worldwide, Inc., Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/726,048

(22) Filed: Mar. 17, 2010

(65) Prior Publication Data

US 2010/0175654 A1    Jul. 15, 2010

Related U.S. Application Data

(62) Division of application No. 12/351,240, filed on Jan. 9, 2009, now Pat. No. 7,707,985.

(51) Int. Cl.
*H01T 13/20* (2006.01)
*H01T 13/39* (2006.01)

(52) U.S. Cl. ................ 123/169 EL; 123/146.5 R

(58) Field of Classification Search ........... 123/169 EL, 123/169 R, 146.5 R; 420/445, 449, 442, 420/446; 148/426–429; 313/141, 118
See application file for complete search history.

(56) References Cited

U.S. PATENT DOCUMENTS

| | | | |
|---|---|---|---|
| 2,391,455 A | 12/1945 | Hensel | |
| 2,902,617 A | 9/1959 | Cole | |
| 3,911,244 A | 10/1975 | Nakamura et al. | |
| 4,144,474 A | 3/1979 | Nishio et al. | |
| 4,400,643 A | 8/1983 | Nishio et al. | |
| 4,581,558 A | 4/1986 | Takamura et al. | |
| 4,742,265 A | 5/1988 | Giachino et al. | |
| 5,017,826 A | 5/1991 | Oshima et al. | |
| 5,172,025 A | 12/1992 | Oshima et al. | |
| 6,138,654 A | 10/2000 | Pretorius et al. | |
| 6,191,525 B1 | 2/2001 | Tanaka et al. | |
| 6,320,317 B1 | 11/2001 | Keller et al. | |

(Continued)

FOREIGN PATENT DOCUMENTS

EP    0140693 B1    12/1989

(Continued)

*Primary Examiner*—Mahmoud Gimie
(74) *Attorney, Agent, or Firm*—Robert L. Stearns; Dickinson Wright, PLLC

(57) ABSTRACT

An electrode for an ignition device formed from a dilute nickel alloy with improved resistance to high temperature oxidation, sulfidation, corrosive wear, deformation and fracture. The electrode includes at least 90% by weight of nickel; zirconium; boron and at least one element from the group consisting of aluminum, magnesium, silicon, chromium, titanium and manganese. The weight ratio of Zr/B may range from about 0.5 to 150, and may include amounts of, by weight of the alloy, 0.05-0.5% zirconium and 0.001-0.01% boron. The oxidation resistance may be improved by the addition of hafnium in an amount that is comparable to the amount of zirconium, which may include an amount of, by weight of the alloy, 0.005-0.2% hafnium. Electrodes of dilute nickel alloys which include aluminum and silicon, as well as those which include chromium, silicon, manganese and titanium, are particularly useful as spark plug electrodes.

12 Claims, 2 Drawing Sheets

U.S. PATENT DOCUMENTS

| | | |
|---|---|---|
| 6,590,318 B2 | 7/2003 | Nishikawa et al. |
| 6,771,009 B2 | 8/2004 | Nishikawa et al. |
| 7,224,108 B2 | 5/2007 | Aisenbrey |

FOREIGN PATENT DOCUMENTS

| | | |
|---|---|---|
| JP | 2006316344 | 11/2006 |
| KR | 1019920004318 B1 | 6/1992 |
| KR | 1020040089951 A1 | 10/2004 |

ELECTRODE FOR AN IGNITION DEVICE

CROSS REFERENCE OF RELATED APPLICATION

This is a Divisional application of U.S. Continuation patent application Ser. No. 12/351,240, filed Jan. 9, 2009 now U.S. Pat. No. 7,707,985, which claims priority to U.S. patent application Ser. No. 11/764,517 filed on Jun. 18, 2007, which is incorporated by reference herein in its entirety.

BACKGROUND OF THE INVENTION

1. Field of the Invention

The invention relates to a high performance electrode made from a dilute nickel alloy containing alloying additions of zirconium and boron that is temperature, oxidation, sulfidation and fracture resistant and, more particularly, toward an electrode for an ignition device, such as a spark plug for an internal combustion engine, furnace, or the like.

2. Related Art

A spark plug is a spark ignition device that extends into the combustion chamber of an internal combustion engine and produces a spark to ignite a mixture of air and fuel. Recent developments in engine technology are resulting in higher operating temperatures to achieve improved engine efficiency. These higher operating temperatures, however, are pushing the spark plug electrodes to the very limits of their material capabilities. Presently, Ni-based nickel-iron-chromium alloys specified under UNS N06600, such as those sold under the trade names Inconel 600®, Nicrofer 7615®, and Ferrochronin 600®, as well as various dilute nickel alloys, are in widespread use as spark plug electrode materials. Dilute nickel alloys are high nickel alloys, having nickel contents that are generally greater than 90% by weight of the alloy, with small amounts of varying alloying elements, such as silicon, aluminum, yttrium, chromium, titanium, cobalt, tungsten, molybdenum, niobium, vanadium, copper, calcium, manganese and the like, to improve the high temperature properties over that of pure nickel, including enhanced resistance to high temperature oxidation, sulfidation and associated corrosive wear, as well as deformation, cracking and fracture associated with cyclic thermo-mechanical stresses resulting from operation of these devices.

As is well known, the resistance to high temperature oxidation of these dilute nickel alloys decreases as their operating temperature increases. Since combustion environments are highly oxidizing, corrosive wear including deformation and fracture caused by high temperature oxidation and sulfidation can result and is particularly exacerbated at the highest operating temperatures. At the upper limits of operating temperature (e.g., 1400° F.), tensile, creep rupture and fatigue strength also have been observed to decrease significantly which can result in deformation, cracking and fracture of the electrodes. Depending on the electrode design, specific operating conditions and other factors, these high temperature phenomena may contribute individually and collectively to undesirable growth of the spark plug gap and diminished performance of the ignition device and associated engine. In extreme cases, failure of the electrode, ignition device and associated engine can result from electrode deformation and fracture resulting from these high temperature phenomena. These failure modes and effects can be particularly problematic in competitive applications, such as racing engines.

Accordingly, there is a need for high performance electrodes made from dilute nickel alloys having improved resistance to high temperature oxidation, sulfidation and related corrosive wear, as well as improved high temperature tensile, creep rupture and fatigue strength and resistance to cracking and fracture.

SUMMARY OF THE INVENTION

In one aspect, the present invention includes an electrode for an ignition device having improved resistance to high temperature oxidation, sulfidation and related corrosive wear, as well as improved high temperature tensile, creep rupture and fatigue strength and resistance to cracking and fracture which is formed from a dilute nickel alloy which includes at least 90% by weight of nickel; zirconium; boron and at least one element from the group consisting of aluminum, magnesium, silicon, chromium, titanium and manganese. The aluminum, silicon, chromium, titanium and manganese as diluent alloy elements may be added in any combination and relative amounts, including all six elements. The addition of zirconium and boron has been observed to have a synergistic effect on the improvement in properties noted in these alloys as compared to the improvements resulting from the addition of either of these elements separately. The zirconium and boron will generally be present in a weight ratio of Zr/B of about 5 to 150, and more particularly about 50 to 100, and most particularly about 70 to 80. While zirconium and boron may be present in any amounts consistent with the requirements of the electrode alloy, it is believed that zirconium in an amount of about 2.74% by weight or less and boron in an amount of about 3.50% by weight or less are generally believed to be the preferred upper limits for these constituents. It is also believed to be preferred that the amount of zirconium be greater than the amount of boron. In dilute nickel alloys which include as diluent elements a combination of aluminum and silicon; aluminum, silicon and yttrium; and chromium, silicon, manganese and titanium, the use of zirconium in the range of 0.005-0.5% by weight of the alloy and boron in the range of 0.001-0.01% by weight of the alloy is particularly useful.

In another aspect, the dilute nickel electrodes of the invention may also include a rare earth alloying addition to enhance the oxidation resistance, including at least one rare earth element from the group consisting of yttrium, lanthanum, cerium and neodymium. In another aspect, to further improve the oxidation resistance, electrodes of the invention may also include hafnium.

In yet another aspect, the dilute nickel electrodes of the invention may also include trace elements including at least one of cobalt, niobium, vanadium, molybdenum, tungsten, copper, iron, carbon, calcium, phosphorus or sulfur.

In yet another aspect, the dilute nickel electrodes of the invention may include silicon and aluminum as diluent alloy elements. An example of a dilute nickel electrode of the invention having silicon and aluminum as diluent alloying elements is an alloy that includes, by weight of said alloy: 1.0-1.5% aluminum; 1.0-1.5% silicon; 0.005-0.5% zirconium; 0.001-0.01% boron and the balance substantially Ni. More particularly, a dilute nickel electrode of the invention having silicon and aluminum as diluent alloying elements is an alloy that includes 1.0-1.5% aluminum; 1.0-1.5% silicon; 0.005-0.5% zirconium; 0.001-0.01% boron; 0.1-0.2% yttrium and the balance Ni and trace elements. Even more particularly, a dilute nickel electrode of the invention having silicon and aluminum as diluent alloying elements is an alloy that includes 1.0-1.5% aluminum; 1.0-1.5% silicon; 0.005-0.5% zirconium; 0.001-0.01% boron; 0.1-0.2% yttrium, 0.005-0.2% hafnium and the balance Ni and trace elements.

In yet another aspect, dilute nickel electrodes of the invention may include chromium, silicon, manganese and titanium as diluent alloy elements. An example of a dilute nickel electrode of the invention having chromium, silicon, manganese and titanium as diluent alloying elements is an alloy that includes, by weight of said alloy: 1.65-1.90% chromium; 0.35-0.55% silicon; 1.80-2.10% manganese, 0.20-0.40% titanium, 0.005-0.5% zirconium; 0.001-0.01% boron and the balance substantially Ni. More particularly, a dilute nickel electrode of the invention having chromium, silicon, manganese and titanium as diluent alloying elements is an alloy that includes 1.65-1.90% chromium; 0.35-0.55% silicon; 1.80-2.10% manganese, 0.20-0.40% titanium, 0.005-0.5% zirconium; 0.001-0.01% boron, 0.005-0.2% hafnium and the balance Ni and trace elements.

In yet another aspect, the ignition device is a spark plug having a generally annular ceramic insulator; a conductive shell surrounding at least a portion of the ceramic insulator; a center electrode disposed in the ceramic insulator having a terminal end and a sparking end with a center electrode sparking surface; and a ground electrode operatively attached to the shell having a ground electrode sparking surface located proximate said center electrode sparking surface, said center electrode sparking surface and said ground electrode sparking surface defining a spark gap therebetween; wherein at least one of said center electrode or said ground electrode is an electrode of the invention.

The spark plug may also have a sparking tip attached to at least one of the center electrode or the ground electrode, wherein the sparking tip includes one of gold, a gold alloy, a platinum group metal or a tungsten alloy. Platinum group metal sparking tips may include at least one element selected from the group consisting of platinum, iridium, rhodium, palladium, ruthenium and rhenium, including alloys thereof in any combination. The platinum group metal may also include at least one element from the group consisting of nickel, chromium, iron, manganese, copper, aluminum, cobalt, tungsten, yttrium, zirconium, hafnium, lanthanum, cerium and neodymium as an alloying addition.

In yet another aspect, the spark plug may have the center electrode operable with one of a positive polarity or a negative polarity and the ground electrode operable at a ground potential.

The subject alloy and spark plug including an electrode made from the alloy overcomes certain disadvantages and shortcomings existing in prior art spark plugs and alloys to provide a dilute nickel alloy material exhibiting the improved resistance to high temperature oxidation/sulfidation, corrosion, deformation and fracture.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Referring to FIGS. 1-6, the present invention is an electrode for an ignition device 5 used for igniting a fuel/air mixture. The electrode may be used in any suitable ignition device 5, including various configurations of spark plugs, glow plugs, igniters and the like, but is particularly adapted for use in various spark plug electrode configurations. The electrodes of an ignition device such as a spark plug are essential to the function of the device. In spark ignition devices, such as spark plugs, the alloys used for the electrodes are exposed to the most extreme temperature, pressure, chemical corrosion and physical erosion conditions experienced by the device. These include exposure of the electrode alloys to numerous high temperature chemical reactant species associated with the combustion process which promote oxidation, sulfidation and other corrosion processes, as well as reaction of the plasma associated with the spark kernel and flame front which promote erosion of the spark surface of the electrode. The electrodes are also subject to thermo-mechanical stresses associated with the cyclic exposure to extreme temperatures, particularly to the extent corrosion processes form corrosion products on the electrode surfaces having different physical and mechanical properties, such as coefficients of thermal expansion, than the electrode alloy. Also, where noble metal spark tips are mechanically deformed, welded or otherwise attached to the electrode ends as sparking surfaces, there are additional cyclic thermo-mechanical stresses associated with the mismatch in the thermal expansion coefficients of the noble metal tip and the electrode materials which can result in various high temperature creep, deformation, cracking and fracture phenomena, resulting in failure of the noble metal tips and electrodes. All of these represent processes by which the properties of the electrodes may be degraded, particularly they can result in changes in the spark gap and thus the formation, location, shape, duration and other characteristics of the spark, which in turn affects the combustion characteristics of the fuel/air mixture and performance characteristics of the engine. The present invention has improved resistance to these degradation processes over that of commonly used dilute nickel alloys that are frequently used as center and ground electrode materials for spark plugs.

Figure 1:
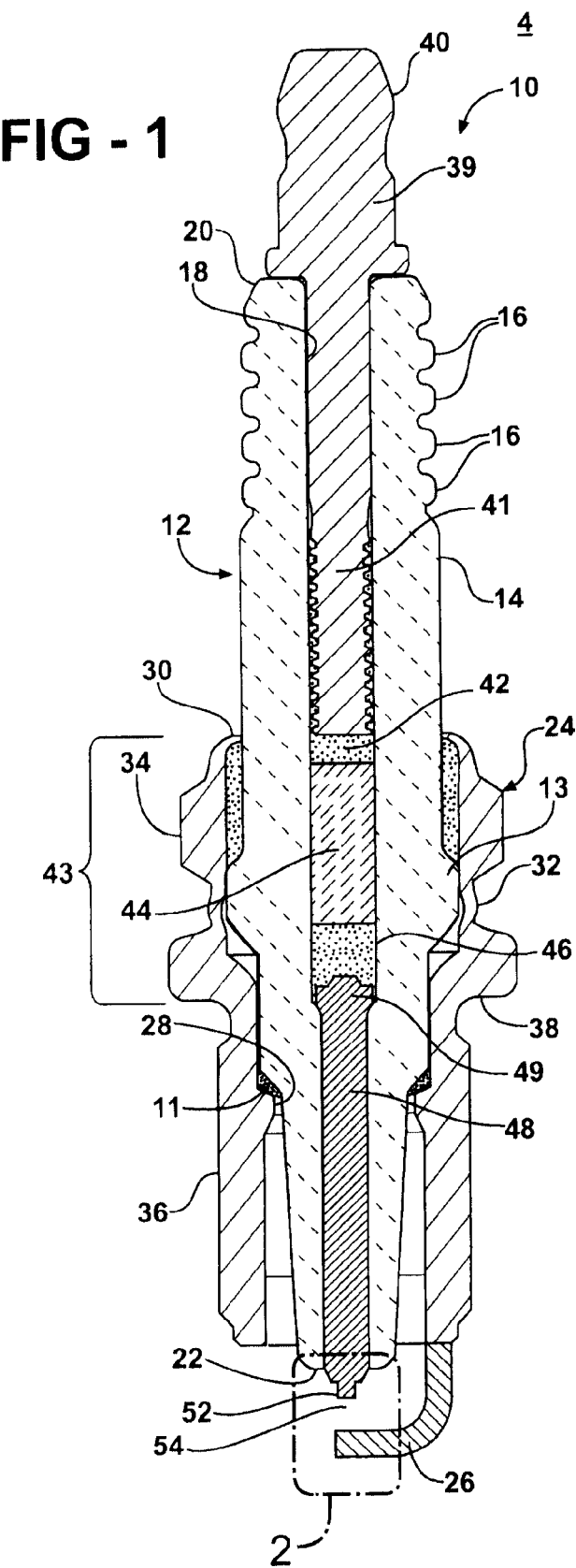
FIG. 1 is a partial cross-sectional view of an exemplary spark plug including shell and center electrodes manufactured from a Ni-based nickel-iron-chromium alloy according to the invention.
Figure 2:
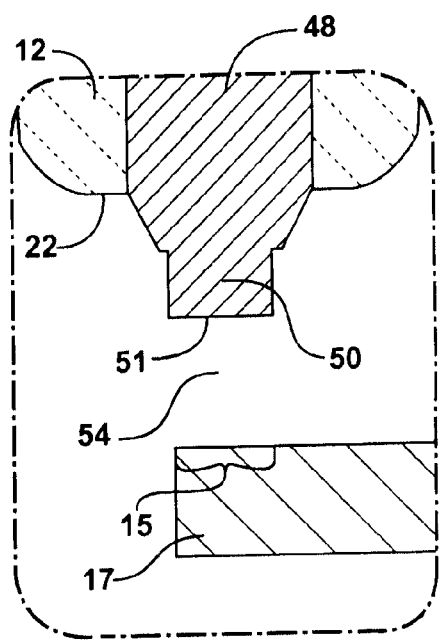
FIG. 2 is a cross-sectional view of region 2 of FIG. 1.
Figure 3:
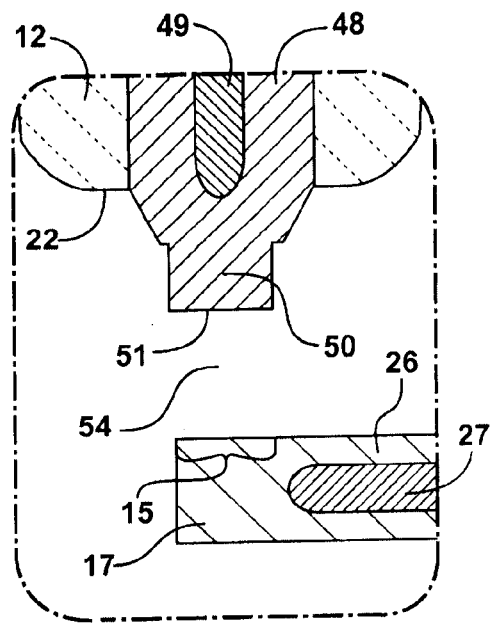
FIG. 3 is a cross-sectional view of region 3 illustrating an alternate electrode configuration to that shown in FIG. 1 having thermally conductive cores.

Referring to FIGS. 1-3, a spark plug having electrodes in accordance with the subject invention is generally shown at 10. The spark plug 10 includes a generally annular ceramic insulator, generally indicated at 12, which includes aluminum oxide or another suitable electrically insulating material having a specified dielectric strength, high mechanical strength, high thermal conductivity, and excellent resistance to thermal shock. The insulator 12 may be press molded from a ceramic powder in a green state and then sintered at a high temperature sufficient to densify and vitrify the ceramic powder. The insulator 12 has an outer surface which may include a partially exposed upper portion 14 to which a rubber or other insulating spark plug boot (not shown) surrounds and grips to electrically isolate an electrical connection of the terminal end 20 of the spark plug with an ignition wire and system (not shown). The exposed mast portion 14 may include a series of ribs 16 or other surface glazing or features to provide added protection against spark or secondary voltage flash-over and to improve the gripping action of the mast portion with the spark plug boot. The insulator 12 is of generally tubular or annular construction, including a central passage 18 extending longitudinally between an upper terminal end 20 and a lower core nose end 22. The central passage 18 generally has a varying cross-sectional area, generally greatest at or adjacent the terminal end 20 and smallest at or adjacent the core nose end 22.

An electrically conductive metal shell is generally indicated at 24. Metal shell 24 may be made from any suitable metal, including various coated and uncoated steel alloys. The shell 24 has a generally annular interior surface which surrounds and is adapted for sealing engagement with the exterior surface of the mid and lower portions of the insulator 12 and includes at least one attached ground electrode 26. While ground electrode 26 is depicted in a commonly used single L-shaped style, it will be appreciated that multiple ground electrodes of straight, bent, annular, trochoidal and other configurations can be substituted depending upon the intended application for the spark plug 10, including two, three and four electrode configurations, and those where the electrodes are joined together by annular rings and other structures used to achieve particular sparking surface configurations. The ground electrode 26 has one or more ground electrode sparking surface 15, on a sparking end 17 proximate to and partially bounding a spark gap 54 located between ground electrode 26 and a center electrode 48 which also has an associated center electrode sparking surface 51. The spark gap 54 may constitute an end gap, side gap or surface gap, or combinations thereof, depending on the relative orientation of the electrodes and their respective sparking ends and surfaces. Ground electrode sparking surface 15 and center electrode sparking surface 51 may each have any suitable cross-sectional shape, including round, rectangular, square and other shapes, and these shapes may be different.

The shell 24 is generally tubular or annular in its body section and includes an internal lower compression flange 28 adapted to bear in pressing contact against a small mating lower shoulder 11 of the insulator 12. The shell 24 generally also includes an upper compression flange 30, which is crimped or formed over during the assembly operation to bear on a large upper shoulder 13 of the insulator 12. Shell may also include a deformable zone 32 which is designed and adapted to collapse axially and radially inwardly in response to heating of deformable zone 32 and associated application of an overwhelming axial compressive force during or subsequent to the deformation of upper compression flange 30 in order to hold shell 34 in a fixed axial position with respect to insulator 12 and form a gas tight radial seal between insulator 12 and shell 24. Gaskets, cement, or other sealing compounds can also be interposed between insulator 12 and shell 24 to perfect a gas-tight seal and to improve the structural integrity of assembled spark plug 10.

Shell 24 may be provided with a tool receiving hexagon 34 or other feature for removal and installation of the spark plug in a combustion chamber opening. The feature size will preferably conform with an industry standard tool size of this type for the related application. Of course, some applications may call for a tool receiving interface other than a hexagon, such as slots to receive a spanner wrench, or other features such as are known in racing spark plug and other applications. A threaded section 36 is formed on the lower portion of metal shell 24, immediately below a sealing seat 38. The sealing seat 38 may be paired with a gasket (not shown) to provide a suitable interface against which the spark plug 10 seats and provides a hot gas seal of the space between the outer surface of the shell 24 and the threaded bore in the combustion chamber opening. Alternately, the sealing seat 38 may be designed as a tapered seat located along the lower portion of the shell 24 to provide a close tolerance and a self-sealing installation in a cylinder head which is also designed with a mating taper for this style of spark plug seat.

An electrically conductive terminal stud 40 is partially disposed in the central passage 18 of the insulator 12 and extends longitudinally from an exposed top post 39 to a bottom end 41 embedded partway down the central passage 18. Top post 39 connects to an ignition wire (not shown) which is typically embedded in an electrically isolating boot as described herein and receives timed discharges of high voltage electricity required to fire the spark plug 10 by generating a spark in spark gap 54.

Bottom end 41 of the terminal stud 40 is embedded within a conductive glass seal 42, forming the top layer of a composite three layer suppressor-seal pack 43. Conductive glass seal 42 functions to seal the bottom end of terminal stud 40 and electrically connect it to a resistor layer 44. This resistor layer 44, which comprises the center layer of the three-layer suppressor-seal pack, can be made from any suitable composition known to reduce electromagnetic interference ("EMI"). Depending upon the recommended installation and the type of ignition system used, such resistor layers 44 may be designed to function as a more traditional resistor-suppressor or, in the alternative, as an inductive-suppressor, or a combination thereof. Immediately below the resistor layer 44, another conductive glass seal 46 establishes the bottom or lower layer of the suppressor-seal pack 43 and electrically connects terminal stud 40 and suppressor-seal pack 43 to the center electrode 48. Top layer 42 and bottom layer 46 may be made from the same conductive material or different conductive materials. Many other configurations of glass and other seals and EMI suppressors are well-known and may also be used in accordance with the invention. Accordingly, electrical charge from the ignition system travels through the bottom end of the terminal stud 40 to the top layer conductive glass seal 42, through the resistor layer 44, and into the lower conductive glass seal layer 46.

Conductive center electrode 48 is partially disposed in the central passage 18 and extends longitudinally from its head 49 which is encased in the lower glass seal layer 46 to its sparking end 50 proximate ground electrode 26. Center electrode sparking surface 51 is located on sparking end 50 and is located opposite ground electrode sparking surface 15, thereby forming a spark gap 54 in the space between them. The suppressor-seal pack electrically interconnects terminal stud 40 and center electrode 48, while simultaneously sealing the central passage 18 from combustion gas leakage and also suppressing radio frequency noise emissions from the spark plug 10 during its operation. As shown, center electrode 48 is preferably a one-piece structure extending continuously and uninterrupted between its head and its sparking end 50. It will be readily understood and within the scope of this invention that the polarity of the center electrode 48 during operation of the spark plug 10 may be either positive or negative such that the center electrode 48 has a potential which is either higher or lower than ground potential.

This is a representative construction of spark plug 10, but it will be readily appreciated that other spark plug 10 or ignition device 5 constructions using insulator 12, shell 24 and electrodes 26 and 48 are possible in accordance with the present invention.

Preferably both, but at least one, of the center 48 and shell 26 electrodes are fabricated from a dilute nickel alloy which has been specially formulated to have improved resistance to the degradation processes described above over that of similar alloy formulations which do not incorporate these improvements. Specifically, the improved alloy formulations incorporate particular amounts of zirconium and boron to the alloy formulation which have been observed to produce improved resistance to the degradation processes described herein over similar alloy formulations which do not include these alloying additions. Generally, the small amounts of zirconium and boron added are substituted for an equivalent amount of nickel to produce this improvement. The electrodes of the invention include solution-strengthened dilute nickel alloys comprising at least 90% by weight of nickel; zirconium; boron and at least one element from the group consisting of aluminum, silicon, chromium, titanium and manganese. Based on similar improvements observed by Applicants in solution-strengthened Ni-based nickel-chromium-iron alloys which also contain zirconium and boron as described herein, namely U.S. patent application Ser. No. 11/764,528 filed on Jun. 18, 2007 which is hereby incorporated by reference in its entirety, it is believed that this invention extends also to spark plug electrodes made from other solution-strengthened Ni-based alloys, including those comprising zirconium, boron, at least one other solution-strengthening constituent and at least 50% nickel. These alloys would include any suitable solution-strengthening constituent, including those described herein. Alloy constituent percentages given herein are percentages by weight of the alloy unless otherwise stated.

The zirconium and boron are generally included in amounts such that the weight ratio of Zr/B ranges from about 5 to 150. However, a more preferred range of this ratio is about 50 to 100, and a most preferred range being about 70 to 80. While zirconium and boron may present in any amounts consistent with the other requirements of the electrode alloy, it is believed that zirconium in an amount of about 2.74% by weight or less and boron in an amount of about 3.50% by weight or less are the preferred upper limits for these constituents. It is also believed to be preferred that the amount of zirconium be greater than the amount of boron. In solution-strengthened dilute nickel alloys generally, the use of zirconium in the range of 0.005-0.5% by weight of the alloy and boron in the range of 0.001-0.01% by weight of the alloy is believed to be particularly useful. In the alloy compositions described above which include at least one element from the group consisting of aluminum, silicon, chromium, titanium and manganese, the use of zirconium in the range of 0.005-0.15% by weight of the alloy and boron in the range of 0.001-0.01% by weight of the alloy is known to be particularly useful. Boron and zirconium are known as grain boundary strengtheners. They segregate to the grain boundaries and serve to stabilize them increasing grain boundary strength and ductility, retarding grain boundary diffusion and sliding and delaying intergranular cracking caused be environmental and mechanical factors under the operating conditions of the electrodes, thereby inhibiting high temperature grain growth and enhancing the resistance of these alloys to high temperature creep, deformation, environmental cracking and various fracture phenomena, such as stress rupture. The performance improvements associated with the addition of zirconium and boron are synergistic, that is they are greater than the improvements that result when either zirconium or boron are added to these alloys separately.

As a further improvement to the degradation resistance of these alloys, particularly by what is believed to be improvement of the high temperature oxidation and sulfidation resistance, the electrode alloy material compositions described above may also include hafnium. The amount of hafnium may range from about 0.005-0.2%. The amount of the hafnium may be generally comparable to the amount of the zirconium, but this is not essential to the invention. By enhancing the resistance to oxidation and sulfidation, the alloy has improved resistance to various cracking and oxide scale spalling phenomena associated with the coefficient of thermal expansion mismatch between those of these species and that of the alloy and thermo-mechanical stresses that tend to propagate such cracks.

The dilute nickel alloys of the invention include at least 90% nickel. The nickel is diluted by one or more diluent elements as an alloying addition. Most generally, these alloys may include as an alloying addition at least one metal selected from the group consisting aluminum, silicon, chromium, titanium and manganese. More particularly, they may include two of these elements in any combination. Even more particularly, they may include three of these elements in any combination. Even more particularly, they may include four of these elements in any combination. Even more particularly, they may include five of these elements in any combination, and most particularly, they may include all six of these elements.

As a further improvement to the degradation resistance of these alloys, particularly by improvement of the high temperature oxidation resistance, the electrode alloy material compositions described above may also include at least one rare earth element as an alloying addition. For purposes of this application, the definition of rare earth elements also includes yttrium and hafnium, as described above, which are reactive transition metals but which produce improvements to these solution-strengthened dilute nickel alloys similar to those produced by the addition of the rare earth element alloying additions. More specifically, the rare earth elements will include at least one element selected from the group consisting of yttrium, hafnium, lanthanum, cerium, and neodymium. However, any combination of rare earth element alloying additions is comprehended within the scope of this invention. Also, more specifically, the compositional range of all rare earth element alloying additions is preferably limited to about 0.1-0.2% by weight of the alloy. In the cases where hafnium is selected, its amounts may range independently of the other rare earth constituents in the manner described above; however, it is preferred that the total of all rare earth element constituents be about 0.1-0.2% by weight of the alloy.

The electrode alloy material may also include trace amounts of other elements. These trace elements may be incidental impurity elements. Typically incidental impurities are associated with the processes used to manufacture the primary alloy constituent materials or the processes used to form the electrode alloy. However, if the purity of the other electrode constituents and the manufacturing process is controlled, these trace elements need not be incidental and their presence or absence and relative amounts may be controlled. The trace elements may include iron, calcium, cobalt, niobium, vanadium, tungsten, molybdenum, copper, carbon, phosphorus and sulfur in any combination. The electrode alloy material of the invention will typically include at least one of these elements, with the total number of them typically associated with the sources and manufacturing methods used to produce the constituents noted. Some of these elements, including iron, cobalt, niobium, tungsten, vanadium, molybdenum, copper and carbon may have a neutral to slightly positive influence on the high temperature properties described herein, while others may have a slightly negative effect on them, including calcium, phosphorus and sulfur. To the extent these elements are present in the alloy, regardless of whether they have a positive or negative effect on its high temperature properties, it is preferred to limits their amounts as follows, by weight of the alloy: cobalt 0.05% max, niobium 0.01% max, vanadium 0.01 max., molybdenum 0.01% max, tungsten 0.01 max., copper 0.05% max, carbon 0.01% max, lead 0.005% max, phosphorus 0.005% max and sulfur 0.005% max.

In an exemplary embodiment of an alloy of the invention having two diluent constituents, the elements may include aluminum and silicon. More particularly, the alloy includes: 1.0-1.5% aluminum; 1.0-1.5% silicon; 0.005-0.5% zirconium; 0.001-0.01% boron and the balance substantially nickel. Even more particularly, for improved resistance to oxidation this alloy may include: 1.0-1.5% aluminum; 1.0-1.5% silicon; 0.005-0.5% zirconium; 0.001-0.01% boron; 0.1-0.2% yttrium and the balance Ni and trace elements. Still even more particularly, for even more resistance to oxidation, this alloy may include: 1.0-1.5% aluminum; 1.0-1.5% silicon; 0.005-0.5% zirconium; 0.001-0.01% boron; 0.1-0.2% yttrium, 0.005-0.2% hafnium and the balance Ni and trace elements.

In another exemplary embodiment of an alloy of the invention having four diluent constituents, the elements may include chromium, silicon, manganese and titanium. More particularly, the alloy includes: 1.65-1.90% chromium; 0.35-0.55% silicon; 1.80-2.10% manganese, 0.20-0.40% titanium, 0.005-0.015% zirconium; 0.001-0.01% boron and the balance substantially Ni. Even more particularly, for improved resistance to oxidation this alloy may include: 1.65-1.90% chromium; 0.35-0.55% silicon; 1.80-2.10% manganese, 0.20-0.40% titanium, 0.005-0.015% zirconium; 0.001-0.01% boron, 0.005-0.2% hafnium and the balance Ni and trace elements.

Spark plug ground electrodes 26 and center electrodes 48 made from the dilute nickel alloy material composition as described have improved resistance to oxidation, sulfidation and associated corrosive wear, as well as improved resistance to cracking and fracture associated with thermo-mechanical stresses in the extremely adverse environment of the combustion chamber of an internal combustion engine.

As shown in FIG. 3, in an alternate electrode configuration, either one or both of the ground electrode 26 and center electrode 48 can be provided with thermally conductive cores 27, 49, respectively, made from material of high thermal conductivity (e.g., ≧250 W/M*° K.) such as copper or silver or various alloys of either of them. Highly thermally conductive cores serve as heat sinks and help to draw heat away from the spark gap 54 region, thereby lowering the operating temperature of the electrodes in this region and further improving their performance and resistance to the degradation processes described herein.

Figure 4:
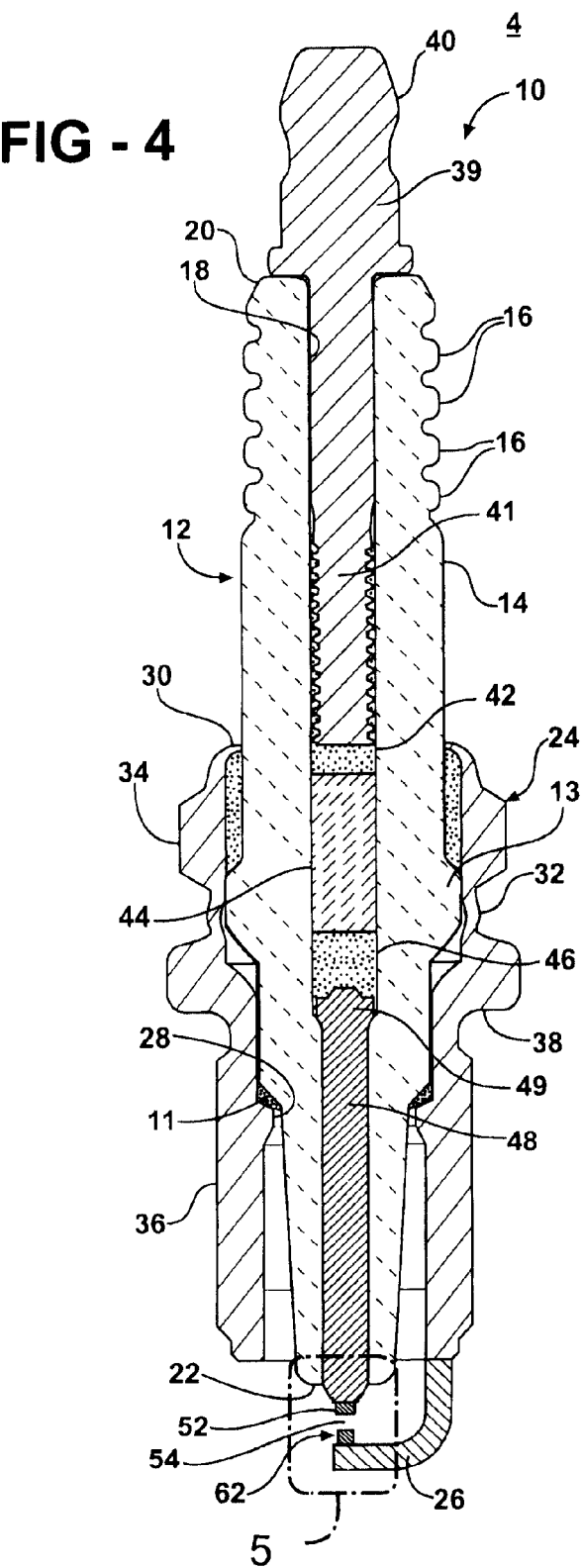
FIG. 4 is a partial cross-sectional view of an exemplary spark plug including shell and center electrodes manufactured from a Ni-based nickel-iron-chromium alloy according to the invention having a high temperature sparking tip.
Figure 5:
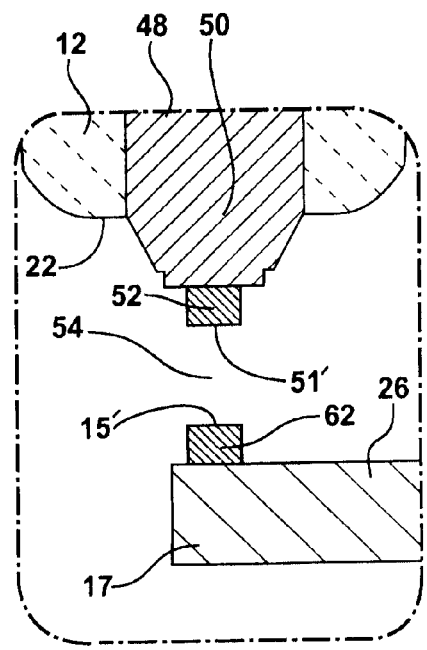
FIG. 5 is a cross-sectional view of region 5 of FIG. 4.
Figure 6:
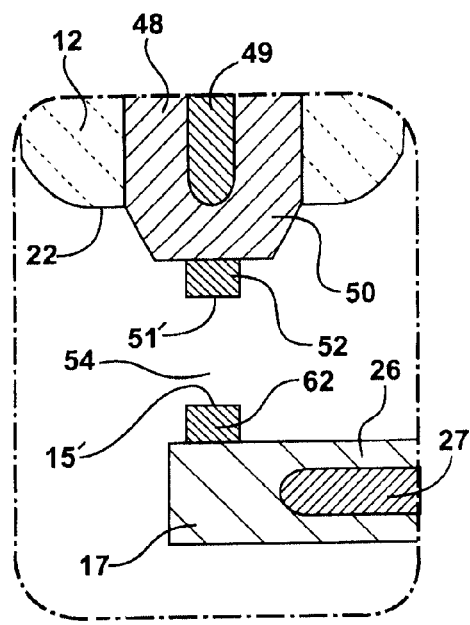
FIG. 6 is a cross-sectional view of region 6 of FIG. 4 illustrating an alternate electrode configuration to that shown in FIG. 4 having thermally conductive cores.

As shown in FIGS. 4-6, the spark plug 10 may also incorporate on the sparking ends of either or both of the ground electrode 26 or center electrode 48 a firing tip 62,52, respectively, of a different high temperature material that has either improved spark performance or resistance to the degradation processes described, or both of them. This may include all manner of noble and non-noble metal firing tips. Center electrode 48 firing tip 52 is located on sparking end 50 of this electrode and has a sparking surface 51'. Ground electrode 26 firing tip 62 is located on sparking end 17 of this electrode and has a sparking surface 15'. Firing tips 52, 62, when used, include respective sparking surfaces 51', 15' for the emission of electrons across the spark gap 54. Firing tip 52 for the center electrode 48 and firing tip 62 for ground electrode 26 can each be made and joined according to any of a number of known techniques, including the formation and attachment, or the reverse, of various pad-like, wire-like or rivet-like firing tips by various combinations of resistance welding, laser welding, or combinations thereof. Firing tips 52, 62 may be made from gold or gold alloys, including Au—Pd alloys, such as Au-40Pd (in weight percent) alloys. Firing tips 52, 62 also may be made from any of the known pure metals or alloys of the platinum group metals, including: platinum, iridium, rhodium, palladium, ruthenium and rhenium, and various alloy combinations thereof in any combination. For purposes of this application, rhenium is also included within the definition of platinum group metals based on its high melting point and other high temperature characteristics similar to those of certain of the platinum group metals. Additional alloying elements for use in firing tips 52,62 may include, but are not limited to, nickel, chromium, iron, manganese, copper, aluminum, cobalt, tungsten, zirconium, and rare earth elements including yttrium, lanthanum, cerium, and neodymium. In fact, any material that provides suitable spark erosion corrosion performance in the combustion environment may be suitable for use as firing tips 52, 62. Firing tips 52, 62 may also be made from various tungsten alloys, including W—Ni, W—Cu and W—Ni—Cu alloys.

The subject dilute nickel electrode materials are also beneficial when a firing tip 52, 62 or other feature is welded to an electrode body made thereof. It provides improved strength and durability and resistance to fracture of the weld at high temperatures. While the subject dilute nickel electrode material has been described for use in the particular application of a shell 26 and/or center 48 electrode for a spark plug 10, it will be appreciated that other uses and applications for the subject alloy to electrodes for other ignition devices will be readily appreciated by those of skill in the art due to the invented material's superior resistance to high temperature oxidation and sulfidation, high temperature mechanical strength, and improvements in resistance to cracking and fracture of weld attachments due to thermo-mechanically induced stresses, particularly weld attachments associated with various firing tip configurations.

Obviously, many modifications and variations of the present invention are possible in light of the above teachings. It is, therefore, to be understood that within the scope of the appended claims, the invention may be practiced otherwise than as specifically described.

What is claimed is:

1. An ignition device, comprising: a spark plug having a center electrode and a ground electrode spaced from one another across a sparking gap therebetween, at least one of said electrodes being fabricated at least in part from an alloy comprising: at least 90% by weight of nickel; zirconium; boron; aluminum and at least one element from the group consisting of, silicon, chromium, titanium and manganese, and wherein by weight of the alloy, aluminum is 1.0-1.5%, zirconium is 0.005-0.5%, boron is 0.001-0.01%.

2. The ignition device of claim 1, wherein the alloy further includes hafnium.

3. The ignition device of claim 1, wherein the balance of the alloy is substantially Ni.

4. The ignition device of claim 1, wherein the alloy further includes at least one rare earth element from the group consisting of yttrium, hafnium, lanthanum, cerium and neodymium.

5. The ignition device of claim 4, wherein, by weight of said alloy: there is 0.1-0.2% yttrium.

6. The ignition device of claim 4, comprising, by weight of said alloy: 0.005-0.2% hafnium.

7. The ignition device of claim 1, including at least one trace element selected from the group consisting of: cobalt, niobium, vanadium, molybdenum, tungsten, copper, iron, carbon, calcium, phosphorus or sulfur.

8. The ignition device of claim 1, wherein said at least one element is selected to include chromium, manganese and titanium.

9. The ignition device of claim 8, comprising, by weight of said alloy: 1.65-1.90% chromium; 0.35-0.55% silicon; 1.80-2.10% manganese, 0.20-0.40% titanium, 0.005-0.5% zirconium; 0.001-0.01% boron and the balance substantially Ni.

10. The ignition device of claim 8, further comprising hafnium.

11. The ignition device of claim 10, comprising, by weight of said alloy: 0.005-0.2% hafnium.

12. The ignition device of claim 1, including, by weight of said alloy, 1.0-1.5% silicon.

* * * * *